United States Patent
Lohneis (10) Patent No.: US 11,631,396 B2
(45) Date of Patent: Apr. 18, 2023

(54) METHOD AND DEVICE FOR LOGGING AN ITEM OF INFORMATION RELATING TO A RAIL VEHICLE

(71) Applicant: Siemens Mobility GmbH, Munich (DE)

(72) Inventor: Georg Lohneis, Ebensfeld (DE)

(73) Assignee: Siemens Mobility GmbH, Munich (DE)

(*) Notice: Subject to any disclaimer, the term of this patent is extended or adjusted under 35 U.S.C. 154(b) by 0 days.

(21) Appl. No.: 17/251,958

(22) PCT Filed: May 23, 2019

(86) PCT No.: PCT/EP2019/063349
§ 371 (c)(1),
(2) Date: Dec. 14, 2020

(87) PCT Pub. No.: WO2019/238380
PCT Pub. Date: Dec. 19, 2019

(65) Prior Publication Data
US 2021/0256964 A1    Aug. 19, 2021

(30) Foreign Application Priority Data
Jun. 12, 2018 (DE) .......................... 102018209308.3

(51) Int. Cl.
*G10L 15/00* (2013.01)
*G10L 15/08* (2006.01)
(Continued)

(52) U.S. Cl.
CPC .......... *G10L 15/08* (2013.01); *B61L 15/0072* (2013.01); *B61L 27/40* (2022.01);
(Continued)

(58) Field of Classification Search
CPC ... G10L 15/08; G10L 15/04; G10L 2015/088; G10L 15/00; G10L 15/1822; G10L 17/22;
(Continued)

(56) References Cited

U.S. PATENT DOCUMENTS 6,345,257 B1   2/2002 Jarrett
9,829,336 B2 * 11/2017 Takei ................. G01C 21/3629
(Continued)

FOREIGN PATENT DOCUMENTS

CN   1967188 A    5/2007
CN   102862587 A  1/2013
(Continued)

OTHER PUBLICATIONS

Railway applications—Designation systematic for railway vehicles—German version EN 15380-2006, Do Not Publish! Protected By Copyright!.
(Continued)

*Primary Examiner* — Abdelali Serrou
(74) *Attorney, Agent, or Firm* — Laurence A. Greenberg; Werner H. Stemer; Ralph E. Locher (57) ABSTRACT

A method for logging an item of information relating to a rail vehicle, includes recording a speech input having the item of information, by a user of the rail vehicle and saving the recorded speech input as an audio file. The saved audio file is sent via a wireless communications network to a subscriber, remote from the rail vehicle, of the communications network. A device logs the subscriber, remote from a rail vehicle, of the communications network.

13 Claims, 2 Drawing Sheets

(51) Int. Cl.
   *B61L 15/00* (2006.01)
   *G10L 15/04* (2013.01)
   *B61L 27/40* (2022.01)

(52) U.S. Cl.
   CPC ........... *G10L 15/04* (2013.01); *B61L 2205/00* (2013.01); *G10L 2015/088* (2013.01)

(58) Field of Classification Search
   CPC ......... G10L 15/22; G10L 15/26; G10L 15/02; G10L 15/10; G10L 15/30; G10L 2015/025; G10L 2015/227; G10L 15/187; G10L 17/24; G10L 2015/027; G10L 2015/225; G10L 2025/783; G10L 21/0364; G10L 25/27; G10L 25/51; G10L 25/60; G10L 25/87; G10L 13/08; G10L 15/063; G10L 2015/0631; G10L 2015/223; B61L 15/0072; B61L 27/0077; B61L 2205/00; B61L 15/0081; B61L 27/0005; B61L 27/0094
   See application file for complete search history.

(56) References Cited

U.S. PATENT DOCUMENTS

| | | | | |
|---|---|---|---|---|
| 10,373,620 | B2* | 8/2019 | Edara | G10L 17/22 |
| 10,498,900 | B2* | 12/2019 | Rose | H04M 3/5335 |
| 10,589,764 | B2* | 3/2020 | Wang | B61L 15/009 |
| 10,593,322 | B2* | 3/2020 | Roh | G10L 15/22 |
| 10,726,836 | B2* | 7/2020 | Baik | G10L 25/57 |
| 10,866,948 | B2* | 12/2020 | Yoon | G10L 15/30 |
| 2005/0171661 | A1 | 8/2005 | Ahdel-Malek et al. | |
| 2007/0093947 | A1 | 4/2007 | Gould et al. | |
| 2008/0164380 | A1 | 7/2008 | Gilbertson | |
| 2015/0012543 | A1* | 1/2015 | Zhang | G06F 16/313 707/741 |
| 2016/0189708 | A1* | 6/2016 | Dides | G10L 15/08 704/251 |
| 2016/0194014 | A1 | 7/2016 | Rajendran | |
| 2017/0353501 | A1* | 12/2017 | Lau | H04L 67/2842 |
| 2018/0005631 | A1* | 1/2018 | Lee | G06F 3/167 |
| 2018/0082697 | A1 | 3/2018 | Iwase et al. | |
| 2018/0086357 | A1 | 3/2018 | Shaw et al. | |
| 2019/0020762 | A1* | 1/2019 | Rose | H04M 3/5335 |

FOREIGN PATENT DOCUMENTS

| | | |
|---|---|---|
| CN | 205344927 U | 6/2016 |
| CN | 107710322 A | 2/2018 |
| DE | 202008009209 U1 | 9/2008 |
| DE | 102013108627 A1 | 4/2014 |
| WO | WO 0035732 A1 | 6/2000 |

OTHER PUBLICATIONS

Song, Juan et al.: "Design and realization of wireless voice recorder", Journal of Beijing Jiaotong University, vol. 35, No. 5, Oct. 2011, pp. 137-140—English abstract.

* cited by examiner

METHOD AND DEVICE FOR LOGGING AN ITEM OF INFORMATION RELATING TO A RAIL VEHICLE

BACKGROUND OF THE INVENTION

The invention relates to a method and to a device for logging an item of information relating to a rail vehicle. The invention also relates to a rail vehicle and to a computer program.

It is known that transfer notifications for a traction unit driver or deficiencies at the traction unit are entered manually into a transfer book and passed on in paper form to a service point.

Furthermore, it is known that a manual selection of deficiencies from a list can be carried out on a screen.

These forms of transfer notifications are very time-consuming.

The laid-open patent application DE 10 2013 108 627 A1 discloses a voice-controlled communication system.

International patent disclosure WO 00/35732 discloses an interactive fault reporting system with which equipment problems and repairs are handled. In this context, the on-board personnel reports equipment problems to a system using a telephone. After the system has been called, the on-board personnel describe the problem in their own words. The computer-assisted reporting system assigns a unique trouble ticket number to the report and to all subsequent repairs.

SUMMARY OF THE INVENTION

The object on which the invention is based is to be considered that of making available a concept for the efficient logging of an item of information relating to a rail vehicle.

This object is achieved by means of the respective subject matter of the independent claims. Advantageous refinements of the invention are the subject matter of respective dependent claims.

According to a first aspect, a method for logging an item of information relating to a rail vehicle is provided, comprising the following steps:
recording a voice message, comprising the item of information, by a user of the rail vehicle
saving the recorded voice message as an audio file, and
sending the saved audio file via a wireless communication network to a subscriber, remote from the rail vehicle, of the communication network.

According to a second aspect, a device for logging an item of information relating to a rail vehicle is provided, comprising:
an acoustic recording apparatus for recording a voice message, comprising the item of information, by a user of the rail vehicle,
an electronic memory for saving the recorded voice message as an audio file, and
a communication interface for transferring the saved audio file via a wireless communication network to a subscriber remote from the rail vehicle, of the communication network.

According to a third aspect, a rail vehicle is provided which comprises the device according to the second aspect.

According to a fourth aspect, a computer program is provided which comprises program code for carrying out the method according to the first aspect when the computer program is run on a computer, for example on the device according to the second aspect.

The invention is based on the realization that the above object can be achieved in that an item of information relating to a rail vehicle is no longer entered manually into a transfer book but rather dictated and recorded.

As a result, e.g. the technical advantage is obtained that such an item of information can be logged more quickly and efficiently.

Sending the saved audio file, which comprises the recorded voice message, to the remote subscriber via the wireless communication network provides e.g. the technical advantage that the item of information can be made available efficiently and quickly to the remote subscriber.

This eliminates the need to expend time on the manual transfer of a transfer book to a service point.

This therefore provides the technical advantage that a concept for the efficient logging of an item of information relating to a rail vehicle is provided.

An item of information according to the description comprises a transfer notification for a rail vehicle driver, for example a traction unit driver.

An item of information according to the description comprises e.g. one or more deficiencies on the rail vehicle.

A wireless communication network comprises, according to one embodiment, a mobile radio network and/or a WLAN communication network.

A rail vehicle according to the description is e.g. motorized or nonmotorized.

A rail vehicle is e.g. one of the following rail vehicles: locomotive, multiple unit, traction unit, railcar, wagon and railbike.

According to one embodiment there is provision that before the saving it is checked whether the recorded voice message comprises at least one predetermined key word, wherein if the recorded voice message does not comprise the at least one predetermined key word, a notification is output to the user stating that the at least one predetermined key word is missing from the recorded voice message.

This provides e.g. the technical advantage that it can be efficiently ensured that the saved audio file contains at least a minimum of information. This is brought about, in particular, by means of a selection of suitable key words.

Furthermore, this provides the technical advantage that, if the user happens to have forgotten, he is reminded efficiently to log certain information items relating to the rail vehicle.

According to one embodiment, there is provision that after the notification is output the system waits for a user input which indicates whether the user wishes to save the already recorded voice message without the at least one predetermined key word or whether the user wishes to add to the already recorded voice message before the saving process, wherein when a corresponding user input is detected, either a voice message of the user which adds to the already recorded voice message is recorded, wherein the already recorded voice message and the recorded additional voice message are saved as the audio file, or the already recorded voice message is saved as the audio file, without the at least one predetermined key word.

This provides e.g. the technical advantage that the user is provided with the opportunity of adding further items of information to the items of information which have already been logged.

According to one embodiment there is provision that the at least one predetermined key word is selected from the following group of key words: operating material identifier, locality identifier, assembly, defect code.

This provides e.g. the technical advantage that it is ensured that particularly important items of information are logged.

In one embodiment, an operating means identifier identifies one of the following elements: bogie, driver's cab or driver's position.

In one embodiment, a locality identifier identifies one of the following elements: running gear, vehicle internal equipment.

In one embodiment, an assembly identifies one of the following elements: wheel system, driver's seat.

Generally, an operating means identifier identifies that operating means of the rail which has a defect.

In general, a location identifier identifies that location at which the operating means which has a defect is located.

In general, an assembly identifies that assembly of the operating means with a defect which has the defect.

In one embodiment, a specific code, for example an alphanumeric code is assigned to the predetermined key word. The assignment is made according to an embodiment according to standard DIN EN 15380, issue June 2006 and/or according to a predetermined defect code list, for example a company-internal defect code list, for example a defect code list of the applicant, that is to say of Siemens AG.

The specific code is therefore, for example, a code according to a predetermined defect code list, for example a company-internal defect code list, for example a defect code list of the applicant, that is to say of Siemens AG.

That is to say, in particular that the identification marking is carried out, for example, in each case according to the standard DIN EN 15380, issue June 2006 and/or on the basis of the predetermined defect code list.

That code which identifies the defect is therefore, according to one embodiment, a code from a predetermined defect code list, for example a company-internal defect code list, for example a defect code list of the applicant, that is to say of Siemens AG, provided that the standard DIN EN 15380, issue June 2006, does not comprise a code which is assigned to a defect.

The following examples are intended to explain the identification marking by way of example:

EXAMPLE 1

Defect: problems with the wheel suspension on the running gear:
According to standard DIN EN 15380, issue June 2006:
Bogie: 71 (code according to DIN EN 15380, issue June 2006)
Running gear: E (code according to DIN EN 15380, issue June 2006)
Wheel system: C (code according to DIN EN 15380, issue June 2006)
Wheel suspension defective: internal defect code 2345 (internal code of Siemens AG of a company-internal defect code list)
Voice input:
Bogie, running gear, wheel system, wheel suspension defective
It is checked whether the recorded voice message corresponding to the voice input comprises an operating means identifier (bogie), a location identifier (running gear), an assembly (wheel system), defect code (wheel suspension defective). If this is the case, the recorded voice message is saved as an audio file and sent to a remote subscriber (the land side with respect to the rail vehicle) via a wireless communication network. If this is not the case, a notification, for example an acoustic and/or visual notification, that one or more predetermined key words are missing is output. The user then has the possibility of inputting the missing key words by means of a further voice input, in order to add to the voice message which has already been recorded.

The audio file which is received by the remote subscriber is further processed. For example, there is provision that the key words on the land side, that is to say, for example, of the remote subscriber, are converted into the following code according to DIN EN 15380, issue June 2006: 71 E C 2345.

EXAMPLE 2

Defect: seat in driver's position defective
According to standard DIN EN 15380, issue June 2006:
Driver's cab: 10 (code according to DIN EN 15380, issue June 2006)
Vehicle interior equipment: D (code according to DIN EN 15380, issue June 2006)
Driver's seat: C (code according to DIN EN 15380, issue June 2006)
Driver's seat defective: internal defect code 5678 (internal code of Siemens AG from a company-internal defect code list)
Voice input:
Driver's cab, vehicle interior equipment, driver's seat defective
It is checked whether the recorded voice message corresponding to the voice input comprises an operating means identifier (driver's cab), a location identifier (vehicle interior equipment), an assembly (driver's seat), defect code (driver's seat defective). If this is the case, the recorded voice message is saved as an audio file and sent via a wireless communication network to a remote subscriber (land side with respect to the rail vehicle). If this is not the case, a notification, for example an acoustic and/or a visual notification, that one or more predetermined key words are missing is output. The user then has the possibility of inputting the missing key words via a further voice input, in order to add to the already recorded voice message.

The audio file received by the remote subscriber is further processed. For example there is provision that the key words are converted on the land side, that is for example by the remote subscriber, into the following code according to DIN EN 15380, issue June 2006: 10 E C 5678.

That is to say, in particular, that the user no longer has to input the code according to DIN EN 15380, issue June 2006 or the code of a predetermined defect code list, for example of a company-internal defect code list. It is sufficient if the user inputs the individual key words verbally. These are then automatically converted, for example by the remote subscriber, into the code according to DIN EN 15380, issue June 2006, and according to the predetermined defect code list. This is, in particular, more efficient, faster and simpler than simply remembering the key words, as an alphanumeric code according to DIN EN 15380, issue June 2006 or according to the predetermined defect code list.

According to one embodiment there is provision that the recording of the voice message is only started in response to detection of a recording start command of the user, and/or wherein the recording of the voice message is ended only in response to detection of a recording stop command of the user.

This provides e.g. the technical advantage that the starting or the ending of the recording of the voice message can be carried out efficiently.

In particular, this provides the technical advantage that the voice message is only started, or the voice message is only stopped, when the user issues a corresponding command.

Such a recording start command or such a recording stop command comprises e.g. an acoustic recording start command or an acoustic recording stop command.

This means, in particular, that the user can start or end the recording by means of voice control.

In another embodiment there is provision that the starting of the recording or ending of the recording is carried out in response to detection of an input on a touch-sensitive screen.

In another embodiment there is provision that a rail vehicle identifier and/or a user identifier and/or a saving date of the saved audio file are/is sent to the subscriber via the wireless communication network.

This provides e.g. the technical advantage that the audio file received by the subscriber can be assigned efficiently to the rail vehicle or the user. In particular, this provides the technical advantage that the audio file received by the subscriber can be efficiently assigned to a time when the audio file is saved or produced.

According to one embodiment there is provision that before the sending of the saved audio file to the remote subscriber the rail vehicle identifier and/or the user identifier and/or the saving date is assigned to the saved audio file or linked thereto.

According to one embodiment, the correspondingly linked audio file is then subsequently sent to the remote subscriber.

According to one embodiment there is provision that the saved audio file is saved only in response to detection of confirmation by the user that the saved audio file is to be sent.

This provides e.g. the technical advantage that before the sending of the audio file the user once more has an opportunity to process the saved audio file.

In one embodiment there is provision that an electronic work slip is generated on the basis of the audio file which has been received by means of the subscriber.

This provides, e.g. the technical advantage that the rail vehicle can be serviced efficiently using the electronic work slip.

In one embodiment there is provision that the electronic work slip is linked to the received audio file.

This provides, e.g. the technical advantage that during servicing or repair of the rail vehicle a service technician has the possibility of listening to the recording, for example using a computer.

According to one embodiment there is provision that the device for logging an item of information relating to the rail vehicle is designed or configured to execute or carry out the method for logging an item of information relating to a rail vehicle.

According to one embodiment there is provision that the method for logging an item of information relating to a rail vehicle is executed or carried out by means of the device for logging an item of information relating to a rail vehicle.

According to one embodiment there is provision that the rail vehicle is designed or configured to execute or carry out the method for logging an item of information relating to a rail vehicle.

Technical functionalities of the device result analogously from corresponding technical functionalities of the method, and vice versa.

This means therefore, in particular, that device features result from corresponding method features, and vice versa.

According to one embodiment there is provision that the device comprises an audio recorder which comprises the acoustic recording apparatus and the electronic memory.

According to one embodiment, the device is a mobile terminal, for example a cellphone.

In one embodiment, the acoustic recording apparatus comprises one or more microphones.

According to one embodiment, a processor is provided which is designed to check, before the saving, whether the recorded voice message comprises at least one predetermined key word.

According to one embodiment, a notification generator is provided which is designed to output a notification to the user stating that the at least one predetermined key word is missing from the recorded voice message if the recorded voice message does not comprise the at least one predetermined key word.

According to one embodiment, the notification generator comprises a screen and/or one or more loudspeakers.

The notification therefore comprises e.g. an acoustic notification and/or a visual notification.

According to one embodiment there is provision that the processor is designed to wait, after the notification is output, for a user input which indicates whether the user wishes to save the already recorded voice message without the at least one predetermined key word or whether the user wishes to add to the already recorded voice message before the saving process, wherein a human-machine interface is provided which is designed to detect a user input, wherein when a corresponding user input is detected by means of the human-machine interface the recording apparatus records a voice message of the user which adds to the already recorded voice message, wherein the memory is designed to save the already recorded voice message and the recorded additional voice message as the audio file, wherein when a corresponding user input is detected by means of the human-machine interface the memory is designed to save the already recorded voice message as the audio file, without the at least one predetermined key word.

According to one embodiment there is provision that the recording apparatus is designed to start the recording of the voice message only in response to detection of a recording start command of the user and/or to end the recording of the voice message only in response to detection of a recording stop command.

According to one embodiment, a human-machine interface is provided which is designed to detect a recording start command and/or a recording stop command of the user.

According to one embodiment, the human-machine interface comprises a touch-sensitive screen and/or a microphone.

According to one embodiment there is provision that the communication interface is designed to send a rail vehicle identifier and/or a user identifier and/or a saving date of the saved audio file to a subscriber via the wireless communication network.

According to one embodiment there is provision that the memory is designed to save the saved audio file only in response to detection of confirmation by the user that the saved audio file is to be sent.

According to one embodiment, the detection of the confirmation of the user that the saved audio file is to be sent is carried out by means of the human-machine interface.

According to one embodiment there is provision that the subscriber is designed to generate an electronic work slip on the basis of the received audio file.

According to one embodiment there is provision that the subscriber is designed to link the electronic work slip to the received audio file.

The formulation "or" comprises, in particular the formulation "and/or".

In one embodiment, there is provision that the subscriber is designed to convert the received audio file into a text file.

In one embodiment the rail vehicle comprises a driver's position.

In one embodiment, the recording apparatus is arranged within the driver's position.

In one embodiment, the memory is arranged within the driver's position.

In one embodiment, the screen, for example the touch-sensitive screen, is arranged within the driver's position.

In one embodiment, the communication interface is arranged within the driver's position.

In one embodiment, the device is arranged within the driver's position.

In one embodiment there is provision that the recording of the additional voice message is only started in response to detection of a further recording start command of the user, and/or wherein the recording of the additional voice message is ended only in response to detection of a further recording stop command of the user.

According to one embodiment, the detection of the further recording start command or the detection of the further recording stop command is carried out by means of the human-machine interface.

Statements in connection with the recording start command and the recording stop command apply analogously to the further recording start command and the further recording stop command.

In one embodiment, the remote subscriber is included in a service station for rail vehicles or in a workshop for rail vehicles.

The remote subscriber is located on a land side with respect to the rail vehicle.

The properties, features and advantages of this invention which are described above as well as the way in which these are achieved become more clearly and distinctly comprehensible in conjunction with the following description of the exemplary embodiments which are explained in more detail in conjunction with the drawings.

DETAILED DESCRIPTION OF THE INVENTION

Figure 1:
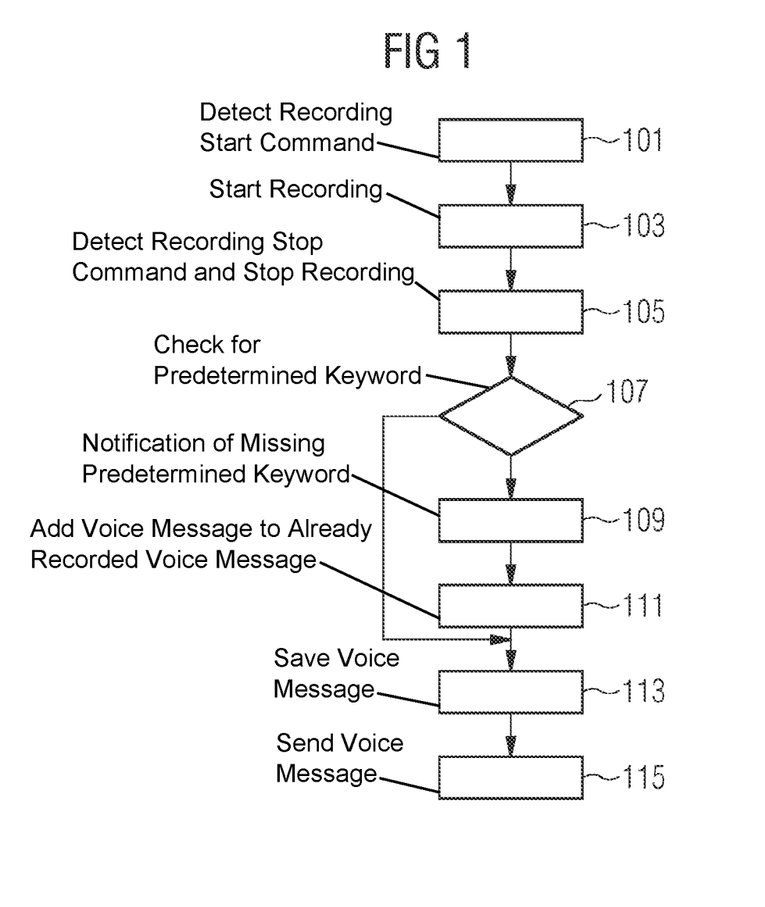
FIG. 1 shows a flow diagram of a method for logging an item of information relating to a rail vehicle.

FIG. 1 shows a flow diagram of a method for logging an item of information relating to a rail vehicle.

According to a step 101 there is provision that a recording start command of a user is detected by means of a human-machine interface, for example by means of a microphone and/or a touch-sensitive screen.

In response to the detection according to step 101 there is provision according to a step 103 that recording of a voice message, comprising the item of information, of the user of the rail vehicle is started, and that the voice message of the user is recorded.

According to a step 105 there is provision that a recording stop command of the user is detected by means of the human-machine interface, wherein the recording of the voice message is ended or stopped in response to this command.

In a step 107 there is provision that before a saving of the recorded voice message as an audio file it is checked whether the recorded voice message comprises at least one predetermined key word or a plurality of predetermined key words.

For this, e.g. a voice recognition process or voice analysis of the recorded voice message is carried out.

If the checking according to step 107 has revealed the recorded voice message does not comprise the at least one predetermined key word, according to a step 109 a notification that the at least one predetermined key word is missing from the recorded voice message is output to the user, for example by means of the human-machine interface.

For example, a visual notification is output by means of a screen, for example by means of a touch-sensitive screen.

For example, an acoustic notification is output via one or more loudspeakers.

According to a step 111 there is provision that a voice message of the user which adds to the already recorded voice message is recorded.

This recording according to step 111 can be started, in a way analogous to the recording according to step 103, using a further recording start command of the user and/or can be ended using a further recording stop command of the user.

The already detected voice message and the additional voice message are subsequently saved in an electronic memory according to a step 113.

If the checking according to the step 107 has revealed that the already recorded voice message contains the at least one predetermined key word, the already recorded voice message is saved as the audio file in the electronic memory according to step 113.

The audio file saved in the electronic memory is sent, according to a step 115, via a wireless communication network to a subscriber of the communication network which is remote from the rail vehicle.

In one embodiment, the remote subscriber is included in a service station for rail vehicles or in a workshop for rail vehicles.

Figure 2:
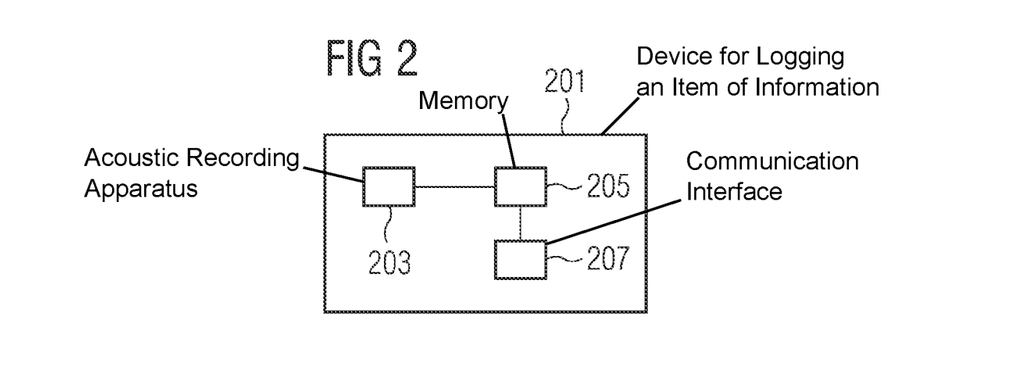
FIG. 2 shows a device for logging an item of information relating to a rail vehicle.

FIG. 2 shows a device 201 for logging an item of information relating to a rail vehicle, comprising:

an acoustic recording apparatus 203 for recording a voice message, comprising the item of information, by a user of the rail vehicle, an electronic memory 205 for saving the recorded voice message as an audio file and a communication interface 207 for transferring the saved audio file via a wireless communication network to a subscriber remote from the rail vehicle, of the communication network.

In one embodiment, the device 201 comprises a processor which is designed to carry out a voice analysis of the recorded voice message or of the further recorded voice message. On the basis of this voice analysis the processor checks e.g. whether the recorded voice message or the additional voice message comprises the at least one key word or the plurality of predetermined key words.

Figure 3:
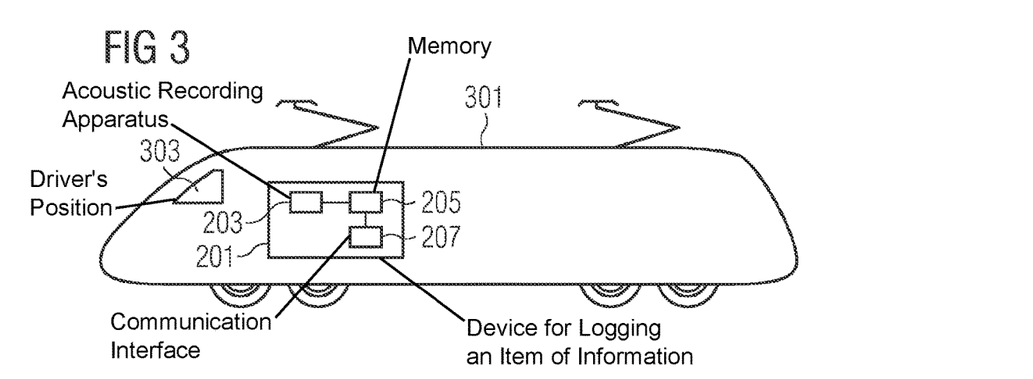
FIG. 3 shows a rail vehicle.

FIG. 3 shows a rail vehicle 301.

The rail vehicle 301 comprises a driver's position 303.

The rail vehicle 301 also comprises the device 201 according to FIG. 2.

In one embodiment, the acoustic recording apparatus 203 is arranged within the driver's position 303.

In one embodiment, the electronic memory 205 is arranged within the driver's position 303.

In one embodiment, the processor is arranged within the driver's position 303.

Figure 4:
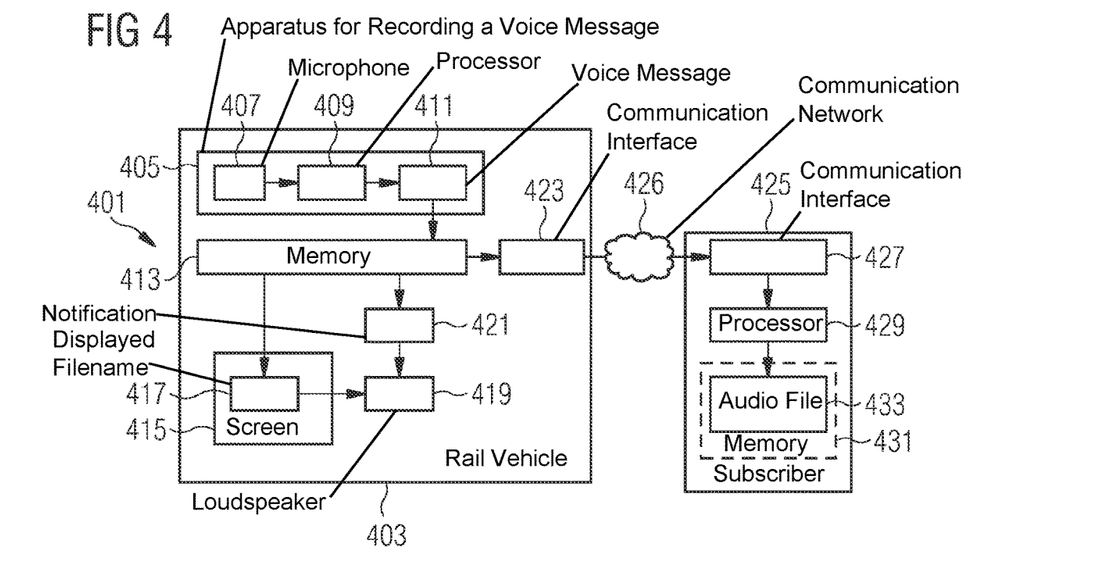
FIG. 4 shows a further device for logging an item of information relating to a rail vehicle.

FIG. 4 shows a further device 401 for logging an item of information relating to a rail vehicle.

The device 401 is included in a rail vehicle 403 which is merely represented symbolically by a rectangle.

In one embodiment (not shown), the device 401 is also disclosed without the rail vehicle 403.

The device 401 comprises an acoustic recording apparatus 405 for recording a voice message, comprising the item of information, of a user of the rail vehicle 403.

The recording apparatus 405 comprises a microphone 407 for detecting the voice message.

The recording apparatus 405 also comprises a processor 409 for carrying out voice recognition of the recorded voice message. Therefore, for example the recorded voice message can be checked to determine whether it comprises one or more predetermined key words.

The recorded voice message, identified symbolically in FIG. 4 by a rectangle with the reference symbol 411 is saved in an electronic memory 413 as an audio file. The memory 413 is included in the apparatus 401.

In one embodiment, the device 401 comprises an audio recorder which comprises the recording apparatus 405 and the memory 413.

The device 401 also comprises a screen 415 which is, for example, a touch-sensitive screen.

The screen 415, for example, can display the audio file, for example display a file name of the audio file.

This display is indicated symbolically in FIG. 4 with a rectangle with the reference symbol 417.

Furthermore, in the case of a touch-sensitive screen it is made possible for the audio file to be processed directly on the screen.

For example the audio file can be selected or deleted on the screen.

The device 401 also comprise a loudspeaker 419 via which the audio file can be output acoustically.

For example, the user can select, by means of a touch-sensitive screen, the audio file which is to be output, insofar as, for example, a plurality of audio files are saved in the memory 413, in order to play it back acoustically via the loudspeaker 419.

Furthermore, a notification, identified symbolically by means of a rectangle with the reference symbol 421, can be played back via the loudspeaker 419 insofar as the checking by the processor 409 has revealed that the recorded voice message does not comprise the at least one predetermined key word.

The device 401 also comprises a communication interface 423 which is designed to communicate via a wireless communication network 426.

The communication network 426 is represented symbolically in FIG. 4 by a cloud symbol.

The saved audio file is sent by means of the communication interface 423 via the wireless communication network 426 to a subscriber 425, remote from the rail vehicle 403, of the communication network 426.

The remote subscriber 425 comprises a further communication interface 427 by means of which the audio file which has been sent is received.

The subscriber 425 also comprises a further processor 429. The further processor 429 is designed, for example, to process and/or evaluate the received audio file.

The received audio file is saved in a further electronic memory 431 which is included in the subscriber 425.

The audio file saved in the electronic memory 431 is represented symbolically in FIG. 4 with a rectangle with the reference symbol 433.

In one embodiment, the audio file is assigned a rail vehicle identifier and/or a user identifier and/or a saving date of the saved audio file so that this information is saved together with the audio file.

A saving date in the sense of the description comprises, in particular, a date and/or a time.

The subscriber 425 is therefore located on a land side with respect to the rail vehicle 403.

The subscriber 425 is included, for example, in a service station for rail vehicles or a workshop for rail vehicles.

In summary, the invention is based on the concept of no longer entering transfer notifications or defects on the rail vehicle manually into a transfer book but rather dictating them. That is to say that according to the invention there is provision for detection of a voice input or of a corresponding voice message which comprises the item of information relating to the rail vehicle.

According to one embodiment, recording of the voice message which comprises the item of information is initiated or started only in response to detection of a recording start command.

According to one embodiment, the recorded voice message is saved in an electronic memory as an audio file. According to one embodiment, the electronic memory is included in a database which is arranged within the rail vehicle.

In one embodiment there is provision that the recording of the voice message is ended only in response to detection of a recording stop command.

In one embodiment there is provision that before the recorded voice message is saved it is checked whether the recorded voice message comprises one or more predetermined key words. Such key words are e.g.: operating means identifier, location identifier, assembly and defect code.

In one embodiment there is provision that insofar as all the expected, that is to say predetermined, key words are not present, a notification is output as an audio output via a loudspeaker. This loudspeaker is located, for example, within a driver's position of the rail vehicle.

The rail vehicle driver then has the possibility of inputting, that is to say adding, the still missing details or information by means of a voice input or audio input.

In one embodiment there is provision that the recorded voice message is made without additional inputting of the key words which are still missing.

According to one embodiment, the saved audio file can be selected on a screen and output via a loudspeaker.

In one embodiment, the saved audio file can be deleted by means of a corresponding input on a touch-sensitive screen.

The saved audio file is transmitted to the land side via a wireless communication network, which corresponds to the step of sending the saved audio file to the remote subscriber.

According to one embodiment, there is provision on the land side that the sent audio file is saved in a further electronic memory. According to one embodiment, the further electronic memory is included in a further database.

The audio file which is saved in the further electronic memory is assigned e.g. a user identifier and/or a rail vehicle identifier and/or a saving date.

In one embodiment, the user identifier is a rail vehicle driver identifier.

In one embodiment there is provision that the audio file received by means of the remote subscriber is converted into a text file.

In one embodiment there is provision that for servicing or repair of the rail vehicle, an electronic work slip is generated from the audio file received by means of the subscriber.

In one embodiment there is provision that the electronic work slip is linked to the audio file received by means of the subscriber. As a result, e.g. a service technician has the possibility of listening to the recording during the servicing, e.g. on a service PC.

In one embodiment there is provision that the starting of the recording or the ending or stopping of the recording are/is carried out by means of an input on a touch-sensitive screen.

This detected input, that is to say the detected recording start command or the detected recording stop command, is then sent from the touch-sensitive screen to the recording apparatus which starts or ends the recording in response to the corresponding command.

Although the invention has been illustrated and described in detail by means of the preferred exemplary embodiments, the invention is not limited by the disclosed examples, and other variations can be derived therefrom by a person skilled in the art without departing from the scope of protection of the invention.

The invention claimed is:

1. A method for logging an item of information relating to a rail vehicle, which comprises the following steps of:
   recording a voice message, including the item of information, by a user of the rail vehicle, wherein the item of information in the voice message that is recorded includes a defect of the rail vehicle;
   checking, with a processor located on the rail vehicle, whether the recorded voice message includes at least one predetermined key word, wherein if the recorded voice message does not include the at least one predetermined key word, a notification is output to the user stating that the at least one predetermined key word is missing from the recorded voice message, and wherein the at least one predetermined key word identifies a part of the rail vehicle that has the defect;
   after checking whether the recorded voice message includes the at least one predetermined keyword, saving the recorded voice message as a saved audio file in an electronic memory located on the rail vehicle;
   sending the saved audio file via a wireless communication network from a communication interface located on the rail vehicle to a subscriber of the wireless communication network, wherein the subscriber is remote from the rail vehicle; and
   wherein the subscriber, which is remote from the rail vehicle, converts the at least one predetermined key word into a defect code according to a predetermined defect code list.

2. The method according to claim 1, wherein after the notification is output the system waits for a user input which indicates whether the user wishes to save the recorded voice message without the at least one predetermined key word or whether the user wishes to add to the recorded voice message before the saving step, wherein when the user input is detected, either a further voice message of the user which adds to the recorded voice message is recorded, wherein the recorded voice message and a recorded further voice message are saved as the audio file, or the recorded voice message is saved as the audio file, without the at least one predetermined key word.

3. The method according to claim 1, which further comprises selecting the at least one predetermined key word from a following group of key words: operating material identifier, locality identifier, assembly, and defect code.

4. The method according to claim 1, which further comprises:
   starting the recording of the voice message only in response to detection of a recording start command of the user; and/or
   ending the recording of the voice message only in response to detection of a recording stop command of the user.

5. The method according to claim 1, which further comprises sending a rail vehicle identifier and/or a user identifier and/or a saving date of the saved audio file to the subscriber via the wireless communication network.

6. The method according to claim 1, which further comprises saving the saved audio file only in response to detection of confirmation by the user that the saved audio file is to be sent.

7. The method according to claim 1, which further comprises generating an electronic work slip on a basis of the saved audio file which has been received by means of the subscriber.

8. The method according to claim 7, which further comprises linking the electronic work slip to a received audio file.

9. The method according to claim 1, wherein the part of the rail vehicle that has the defect is located outside of a cab of the rail vehicle.

10. The method according to claim 1, wherein the part of the rail vehicle that has the defect is part of a bogie.

11. A device for logging an item of information relating to a rail vehicle, the device comprising:
   an acoustic recording apparatus for recording a voice message, including the item of information, by a user of the rail vehicle, wherein the item of information in the voice message that is recorded includes a defect of the rail vehicle;
   an electronic memory for saving a recorded voice message as an audio file;
   a processor configured for, before the saving, checking whether the recorded voice message includes at least one predetermined key word, wherein if the recorded voice message does not include the at least one predetermined key word, a notification is output to the user stating that the at least one predetermined key word is missing from the recorded voice message, and wherein the at least one predetermined key word identifies a part of the rail vehicle that has the defect; and
   a communication interface for transferring the saved audio file via a wireless communication network from the rail vehicle to a subscriber remote from the rail vehicle, of the wireless communication network.

12. A combination, comprising:
   a rail vehicle;
   a device for logging an item of information relating to the rail vehicle, wherein the item of information includes a defect of the rail vehicle; and a subscriber of a wireless communication network, the subscriber located remote from the rail vehicle;

the device located on the rail vehicle and the device including:

an acoustic recording apparatus for recording a voice message, including the item of information, by a user of the rail vehicle;

an electronic memory for saving a recorded voice message as an audio file;

a processor configured for, before the saving, checking whether the recorded voice message includes at least one predetermined key word, wherein if the recorded voice message does not include the at least one predetermined key word, a notification is output to the user stating that the at least one predetermined key word is missing from the recorded voice message, and wherein the at least one predetermined key word identifies a part of the rail vehicle that has the defect; and a communication interface for transferring the saved audio file via the wireless communication network from the rail vehicle to the subscriber of the wireless communication network;

wherein the subscriber, which is remote from the rail vehicle, is configured for converting the at least one predetermined key word into a defect code according to a predetermined defect code list.

13. A non-transitory computer readable medium containing computer-executable instructions, the computer-executable instructions when run on a computer performing a method for logging an item of information relating to a rail vehicle, which comprises the following steps of:

recording a voice message, including the item of information, by a user of the rail vehicle, wherein the item of information in the voice message that is recorded includes a defect of the rail vehicle;

checking, with a processor located on the rail vehicle, whether the recorded voice message includes at least one predetermined key word, wherein if the recorded voice message does not include the at least one predetermined key word, a notification is output to the user stating that the at least one predetermined key word is missing from the recorded voice message, and wherein the at least one predetermined key word identifies a part of the rail vehicle that has the defect;

after checking whether the recorded voice message includes the at least one predetermined keyword, saving the recorded voice message as an audio file in an electronic memory located on the rail vehicle; and sending the saved audio file via a wireless communication network from a communication interface located on the rail vehicle to a subscriber of the wireless communication network, wherein the subscriber is remote from the rail vehicle.

* * * * *